(12) United States Patent
Kuster (10) Patent No.: US 11,956,096 B2
(45) Date of Patent: Apr. 9, 2024

(54) AUTOMOTIVE, NAVAL, AND AIRCRAFT BUS-EMULATOR

(71) Applicant: Martin Kuster, Walchwil (CH)

(72) Inventor: Martin Kuster, Walchwil (CH)

(73) Assignee: ROCKPATECH AG, INC. (CH)

( * ) Notice: Subject to any disclaimer, the term of this patent is extended or adjusted under 35 U.S.C. 154(b) by 0 days.

(21) Appl. No.: 17/762,076

(22) PCT Filed: Sep. 16, 2020

(86) PCT No.: PCT/IB2020/058586
§ 371 (c)(1),
(2) Date: Mar. 20, 2022

(87) PCT Pub. No.: WO2021/053517
PCT Pub. Date: Mar. 25, 2021

(65) Prior Publication Data
US 2022/0393905 A1    Dec. 8, 2022

Related U.S. Application Data

(60) Provisional application No. 62/903,711, filed on Sep. 20, 2019.

(51) Int. Cl.
*H04L 12/40* (2006.01)

(52) U.S. Cl.
CPC ......... *H04L 12/40006* (2013.01); *H04L 2012/40273* (2013.01)

(58) Field of Classification Search
CPC .......... H04L 12/40006; H04L 2012/40273
See application file for complete search history.

(56) References Cited

U.S. PATENT DOCUMENTS

| | | | | |
|---|---|---|---|---|
| 2004/0089825 A1* | 5/2004 | Schwenke | ............. | G01N 15/14 250/573 |
| 2005/0041237 A1* | 2/2005 | Richter | ................ | G06F 3/0421 356/614 |
| 2009/0082614 A1* | 3/2009 | Feucht | .................... | A61N 1/40 600/14 |

(Continued)

FOREIGN PATENT DOCUMENTS

WO    2021/053517    3/2021

OTHER PUBLICATIONS

International Search Report and Written Opinion in related International Application No. PCT/IB2020/058586 dated Nov. 20, 2020, 9 pages.

(Continued)

*Primary Examiner* — Henry Tsai
*Assistant Examiner* — John B Roche
(74) *Attorney, Agent, or Firm* — Kilpatrick Townsend & Stockton LLP (57) ABSTRACT

A bus emulator device includes a first computer, a second computer, and an information interface. The first computer is configured to connect to a main bus system. The first computer includes at least write access into the information interface, and the second computer includes only read access into the information interface. In other aspects, the first computer includes only write access into the information interface, and the second computer includes at least read access into the information interface.

7 Claims, 6 Drawing Sheets

(56) References Cited

U.S. PATENT DOCUMENTS

| | | | | |
|---|---|---|---|---|
| 2013/0341172 | A1* | 12/2013 | Park | H01H 1/12 |
| | | | | 200/512 |
| 2015/0253952 | A1* | 9/2015 | Shikata | G06F 3/04883 |
| | | | | 715/784 |
| 2018/0004964 | A1* | 1/2018 | Litichever | H04L 12/40143 |
| 2018/0205703 | A1* | 7/2018 | Grau | B60R 25/30 |
| 2020/0065348 | A1* | 2/2020 | Park | G06F 3/0482 |
| 2020/0145338 | A1* | 5/2020 | Dorot Ratzer | H04L 12/66 |

OTHER PUBLICATIONS

PCT Application No. PCT/IB2020/058586, "International Preliminary Report on Patentability", dated Mar. 31, 2022, 7 pages.

* cited by examiner

AUTOMOTIVE, NAVAL, AND AIRCRAFT BUS-EMULATOR

CROSS-REFERENCE TO RELATED APPLICATION

This application is the U.S. national phase of International Application No. PCT/M2020/058586 filed on Sep. 16, 2020, and published on Mar. 25, 2021 as International Publication No. WO 2021/053517 A1, which claims the benefit of U.S. Provisional Patent Application No. 62/903,711, filed on Sep. 20, 2019 and entitled AUTOMOTIVE, NAVAL, AND AIRCRAFT BUS-EMULATOR, both of which are hereby incorporated by reference in its entirety their entireties.

FIELD OF THE INVENTION

This application relates to internal bus systems of various devices or systems that are connectable to external networks.

BACKGROUND

Many devices and systems today include a number of mission critical devices or systems and a number of peripheral devices or systems that are commonly connected through a centralized bus system such that the devices and systems can communicate with each other. As used herein, peripheral devices or systems refers to those devices or systems with an external connection. Such external connections may be through physical connection (e.g., USB connectors, on-board diagnostic (OBD) connectors, etc.) or through the Internet or other various networks (e.g., LTE, Wi-Fi, Bluetooth, LAN, etc.). Examples of devices and systems that use centralized bus systems to connect peripheral devices and mission critical devices include, but are not limited to, transportation devices (e.g., automobiles, naval vessels, aircraft, trains, etc.), heavy industry, etc. are equipped with modern centralized bus systems.

The general functionality and purpose of such centralized bus systems is to create a single bus system for all the technology devices and systems used in a particular system or device (e.g., in an automobile) such that the technology can communicate with each other to share data and exchange information. In the example of an automobile, peripheral devices or systems may include entertainment systems, navigation systems, alarming systems, diagnostic systems, etc., and mission critical devices or systems may include the engine, brakes, accelerator, fuel injector, etc.

Because all of the technology devices and systems are commonly connected with the central bus system, it is possible to remotely hijack or remotely access one of the devices or systems and gain access to the central bus system, and, from that access, proceed to access and control other technology devices and systems. For example, with an automobile, a hacker may access the central bus system completely remotely through an external network connection of one of the peripheral devices such as a mobile phone in the car, the entertainment system, the navigation system, the radio, etc. Additionally or alternatively, the hacker may "plug in" to the bus system through some hardware of the transportation device (such as an OBD connector in an automobile). As a result, it is possible for a hacker to break into the central bus system and potentially turn the device into a weapon by remotely increasing the speed of the transportation device, disabling the brake system, etc.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a bus emulator device includes a first computer, a second computer, and an information interface. In some embodiments, the first computer is configured to connect to a main bus system, the first computer includes only write access into the information interface, and the second computer includes only read access into the information interface.

In various embodiments, the main bus system includes at least one mission critical system, and the second computer is configured to simulate the at least one mission critical system in an emulated bus system. In some cases, the emulated bus system includes at least one peripheral system connectable to an external network. In certain aspects, the bus emulator device includes a tact generator, and the first computer, the second computer, and the information interface run on the tact generator.

According to certain embodiments of the present invention, a system includes a first bus system, a second bus system, and a bus emulator device connected to the first bus system and the second bus system. In certain embodiments, the bus emulator device physically isolates the first bus system from the second bus system.

In some embodiments, the first bus system is a main bus system having at least one mission critical system, and the second bus system includes at least one peripheral system connectable to an external network and an emulated system simulating the at least one mission critical system.

According to certain embodiments of the present invention, a bus system includes a first system and a second system. In some embodiments, the first system is at least one physical system, and the bus system is directly connected to the at least one physical system. In various embodiments, the second system is an emulated system including at least one simulation of a third system.

According to certain embodiments of the present invention, a bus emulator device includes an information interface. The bus emulator device may be configured to connect to a main bus system and an emulated bus system, and the information interface may define a one-way data exchange between the main bus system and the emulated bus system.

According to certain embodiments of the present invention, a bus emulator device includes a first computer, a second computer, and an information interface. In some embodiments, the first computer is configured to connect to a main bus system, the first computer includes at least write access into the information interface, and the second computer comprises only read access into the information interface. In certain embodiments, the first computer also includes read access into the information interface.

According to certain embodiments of the present invention, a bus emulator device includes a first computer, a second computer, and an information interface. In various embodiments, the first computer is configured to connect to a main bus system, the first computer includes only write access into the information interface, and the second computer includes at least read access into the information interface. In some embodiments, the second computer also includes write access into the information interface.

According to certain embodiments of the present invention, a bus emulator device includes a first computer, a second computer, an information interface, and an additional memory. In certain aspects, the first computer is configured to connect to a main bus system, and the first computer includes at least write access into the information interface. In various embodiments, the second computer includes only read access into the information interface. In some embodiments, the first computer has no access to the additional memory, and the second computer includes read access and write access into the additional memory.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Certain embodiments of the present invention provide a bus emulator device that includes at least two independent computers that may or may not share memory or part of memory (i.e., at least a first independent computer and a second independent computer) and at least one independent physical memory (or "information interface"). The first independent computer is connectable to the central or main bus system (also called a "hot-bus") of the transportation device and the second independent computer emulates a bus similar to the main bus system (also called an "emulated bus system" or a "cold bus"). There is no direct connection from the main bus ("hot bus") to the open Internet, open Wi-Fi or any other open network. In some examples, the main bus may have a controlled secure network connection (e.g., to an emergency network).

The first independent computer (connected to the main bus system) (also called the "main computer") has full access to the main bus and the information on the main bus. The second independent computer (also called the "emulation computer") has only read access to the information of the first independent computer that is connected to the main bus. The second independent computer can read current and past status information from the main computer but he cannot modify the information. This configuration of the second independent computer may be achieved in a number of different ways. As one non-limiting example, the emulation computer may have read access to parts of the memory of the main computer (but does not have delete/modify/write rights). As another non-limiting example, the emulation computer may get the information from the main computer as a request from the emulation computer or automatically (i.e., a push from main computer). With this information of the main computer, the emulation computer emulates the main bus, meaning that the emulation computer builds up a "virtual" bus that looks exactly like the main bus. External devices and services may access this emulated bus instead of the main (hot) bus. This allows all external services (navigation, diagnostic, convenient services etc.) to obtain the information they need from the vehicle to deliver their services, but without the capability to modify this information directory. This dramatically lowers the risk for the vehicle to be hijacked and/or manipulated by external sources. Various other suitable configurations may be utilized.

In the event that external services need to share information with the main bus, they can modify the information in the emulated bus only. In such examples, the main computer (hot computer) can read out this information and check the information for plausibility and safety. In some cases, if the information is safe and passes all safety and security tests, the main computer has the capability to use this information in the hot bus system. In this manner, updates for traffic conditions on the navigation system or other updates are still possible.

When the bus emulator device is installed with a device having a main bus system (e.g., in an automobile, ship, aircraft, etc.), the first independent computer connects with the main bus system. Any number of critical devices or systems are connected to the main bus system including, but not limited to, the engine, brakes, accelerator, suspension, fuel injection, steering, power steering, navigation, identification (e.g., transponders), etc. While the first independent computer is connected with the main bus system, the first independent computer writes (in real time or as otherwise desired) all needed data or information from those critical devices or systems (e.g., engine conditions, motor parameters, speed, etc.) into the information interface. The second independent computer (handling the emulated bus system) reads this data from the information interface (in real time or as otherwise desired) and uses the read data to emulate the main bus system in the emulated bus system. In various aspects, the emulated bus system may look the same as the main bus system but without a physical connection into the main bus system. Additional peripheral devices or systems including, but not limited to, smart navigation systems, entertainment systems, internet access systems, OBD connectors, interfaces with USB connectors, mobile phone connections, alarming systems, etc., are physically connected to the emulated bus system and do not have any physical connection to the main bus system.

The bus emulator systems and devices described herein provide a cost-efficient and cost-effective solution to increase safety of central bus systems of devices and can be integrated without major modification to new and existing central bus systems.

In one example, a system according to aspects of the current disclosure creates a second bus system to separate mission critical systems from other systems that may have additional connection. In other aspects, the system physically isolates the mission critical bus system of a vehicle, vessel, plane or any other device/industrial unit.

Figure 1:
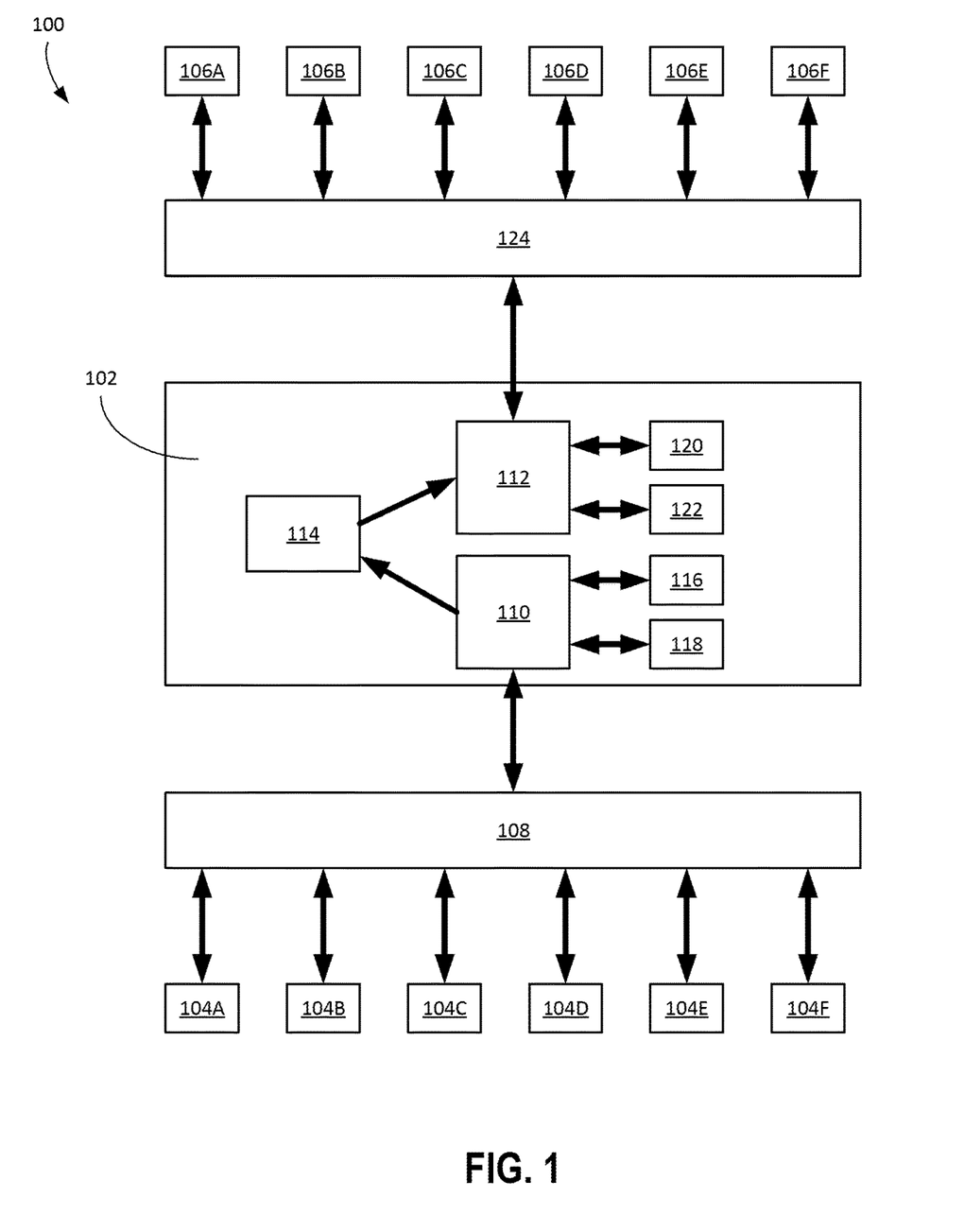
FIG. 1 is a schematic of a transportation device with a bus emulator device according to embodiments of the disclosure.

FIG. 1 is a diagram illustrating an example of a bus emulator device 102 provided in a transportation device 100. As illustrated, the transportation device 100 includes one or more mission critical systems or devices 104A-F. In some non-limiting examples, mission critical systems or devices 104 may include, but are not limited to, the engine, brakes, accelerator, fuel injector, etc. In other examples, the mission critical systems or devices 104 may be different devices or systems, and the listed mission critical devices or systems or the characterization of devices or systems as "mission critical" should not be considered limiting on the current disclosure. The number of mission critical devices 104 should not be considered limiting on the current disclosure. The transportation device 100 may also include one or more peripheral systems or devices 106A-F. In some non-limiting examples, peripheral devices may include, but are not limited to, navigation systems, radio, USB connectors, OBD connectors, entertainment systems, alarm systems, etc. In other examples, the peripheral systems or devices 106 may be different devices or systems, and the listed peripheral devices or systems or the characterization of devices or systems as "peripheral" should not be considered limiting on the current disclosure. The number of peripheral devices 106 should not be considered limiting on the current disclosure. The mission critical devices 104A-F are connected into a main bus system 108 such that a normal exchange of data and information among the mission critical devices 104 is possible. In certain examples, the peripheral devices 106A-F are connected to the bus emulator device 102 such that they have read access to the information of the main bus system 108 (from the mission critical devices) but cannot modify the information. In some examples, the peripheral devices 106 are not physically connected into the main bus system 108.

The bus emulator device 102 includes a first independent computer 110, a second independent computer 112, and the independent physical memory or information interface 114. While a single bus emulator device 102 is illustrated, it will be appreciated that any number of devices 102 could be utilized. In some cases, each mission critical device 104 may have a dedicated emulator, although it need not in other examples. In various examples, the computer 110, the computer 112, and the information interface 114 run on the same tact generator, although they need not in other examples.

The first independent computer 110 may be associated and in communication with Boot ROM 116 and a memory subsystem 118. Similarly, the second independent computer 112 may be associated and in communication with Boot ROM 120 and a memory subsystem 122. The independent computers 110, 112 may be general purpose processing units, processors specially designed for the bus emulator, a field-programmable gate array (FPGA), an application-specific integrated circuit (ASIC), a microprocessor, etc.

The information interface 114 and memory subsystems 118, 122 may include a long-term storage memory and/or a short-term working memory and may be various suitable types of computer-readable medium including, but not limited to, include magnetic disks, memory chips, ROM, random-access memory (RAM), an ASIC, a configured processor, optical storage, or any other medium from which a processor can read the instructions. In some cases, the information interface 114 is shared memory where the first independent computer 110 has at least write capabilities (and optionally has read capabilities) and the second independent computer 112 only has read capabilities. In this example, the information interface 114 may always include the information from the hot bus system 108 (via the first independent computer 110) so that the second independent computer 112 can read the information to emulate the cold bus system 124. In other examples, the information interface 114 may be a memory that is only controlled by the second independent computer 112, and the second independent computer 112 may use it to directly emulate the cold bus system 124. In these examples, the second independent computer 112 may get the information by push from the first independent computer 110 or upon request. In further examples, the first independent computer 110 and the second independent computer 112 may each include at least one additional memory. In these examples, the first independent computer 110 may build up the information on the information interface 114, the second independent computer 112 may copy the information from the information interface 114 to its additional memory, and the second independent computer 112 may then allow peripheral devices to read and/or modify the content on the additional memory.

The first independent computer 110, the second independent computer 112, and the information interface 114 are arranged and connected such that the second independent computer 112 can read current and past status information provided by or on the first independent computer 110 but cannot modify such information.

FIG. 1 illustrates one configuration of the first independent computer 110, the second independent computer 112, and the information interface 114 where the second independent computer 112 can read current and past status information provided by or on the first independent computer 110 but cannot modify such information. As illustrated in FIG. 1, in some examples, the first independent computer 110 has write access to the information interface 114 but not read access. In other examples, and as discussed in detail below, the first independent computer 110 has full access to the information interface 114 (e.g., read, write, delete, modify, etc.). The second independent computer 112 has read access to the information interface 114 but not write access. In other words, the information interface 114 is a one-way memory for data exchange between the main bus system 108 and an emulated bus system 124. In some examples, the second independent computer 112 may read the information interface 114 upon a request and/or automatically (e.g., as a push).

Through the particular configuration of the bus emulator device 102 (i.e., the second independent computer 112 can read current and past status information provided by or on the first independent computer 110 but cannot modify such information), the first independent computer 110 writes all needed information and data from the mission critical devices 104A-F into the information interface 114. The second independent computer 112 reads the information and data from the information interface 114 and uses the data and information to emulate the main bus system 108 in the emulated bus system 124. As illustrated, the emulated bus system 124 may not have a physical (or direct) connection into the main bus system 108. In other words, the emulated bus system 124 is only able to indirectly access information and data from the main bus system 108 via the bus emulator device 102.

In various examples, the emulated bus system 124 may look the same or substantially the same as the main bus system 108 (although it need not be), meaning that the emulated bus system 124 can simulate each of the mission critical devices 104A-F. The peripheral devices 106A-F may physically connect into the emulated bus system 124, but the peripheral devices 106A-F do not have a physical connection to the main bus system 108. In other words, because the second independent computer 112 can only read the information interface 114, the emulated bus system 124 (and systems or devices connected to the emulated bus system 124) cannot manipulate the main bus system 108 (and systems or devices connected to the main bus system 108). In certain examples, providing the first independent computer 110 such that can only write into the information interface may provide an additional layer of security between the two computers. However, in other examples and as discussed in detail below, the first independent computer 110 may have full access to the information interface.

Figure 2:
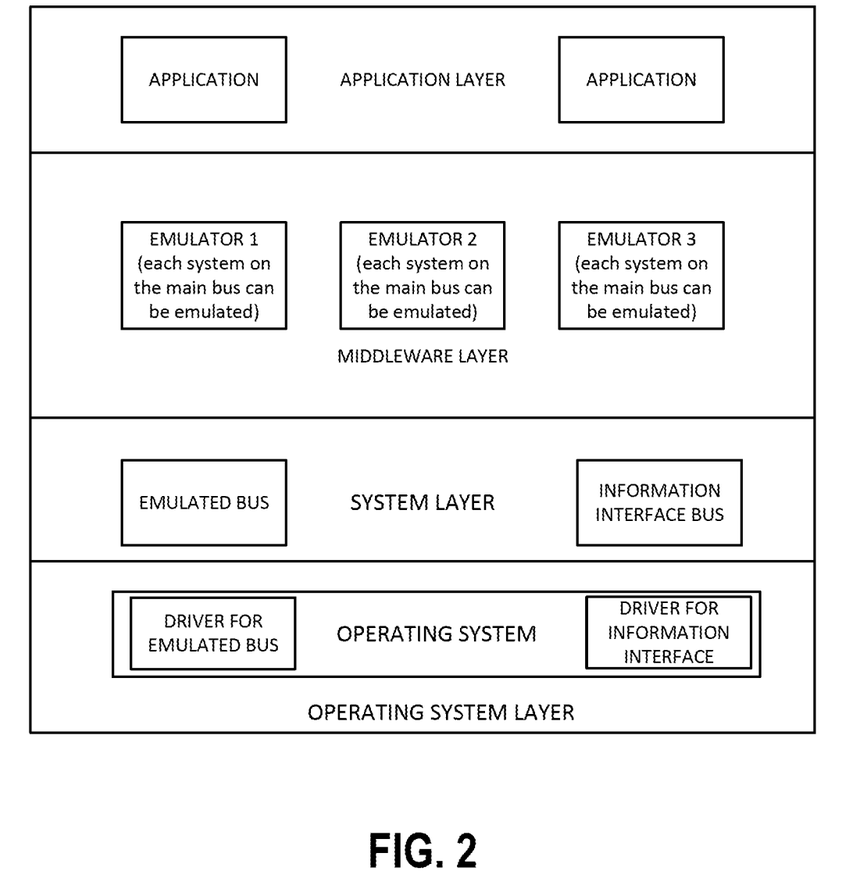
FIG. 2 illustrates a software or firmware architecture of a bus emulator system according to embodiments of the disclosure.

FIG. 2 illustrates a non-limiting example of a possible software or firmware architecture on the emulated bus side. This software may be installed in the Boot ROM 120 or other computer readable medium associated with the second independent computer 112. The software architecture can be programmed in various suitable programming languages as desired.

With the bus emulator device 102, the peripheral devices 106A-F may not realize that there is no physical or direct connection to the mission critical devices 104A-F. This configuration may make it possible to install the bus emulator device in existing environments while maintaining compatibility. Such a configuration allows the peripheral devices 106A-F to still use the information from the mission critical devices 104A-F without being able to manipulate the mission critical devices 104A-F. As a non-limiting example, an OBD connector (a peripheral device) may connect with the emulated bus system 124 to perform various diagnostics on the vehicle, but the OBD connector cannot be used to manipulate the mission critical devices 104. Updating of all peripheral devices is still possible with the bus emulator device 102. It will be appreciated that through the bus emulator device 102, the emulated bus system 124 combines physical systems or devices (i.e., the peripheral devices 106) and virtual or emulated systems or devices (i.e., the simulated mission critical devices from reading the information interface 114).

Figure 3:
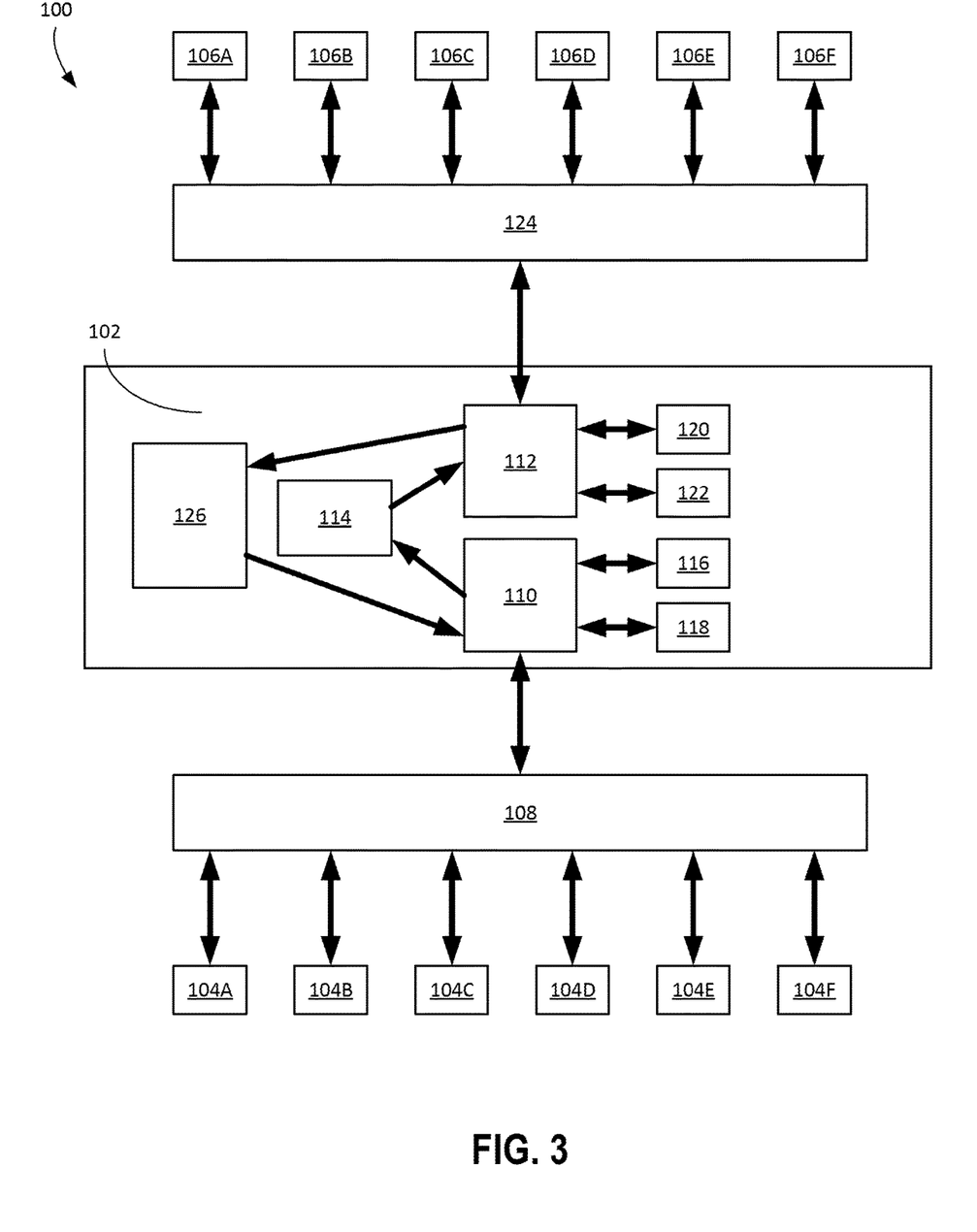
FIG. 3 is a schematic of a transportation device with a bus emulator device according to embodiments of the disclosure.

Referring to FIG. 3, in some examples, the bus emulator device 102 optionally includes a second shared memory space 126 (or second information interface). Optionally, the second shared memory space 126 may allow for the write back of selected registers into the main bus system 108. Such selected registers may be predefined and controlled to limit the manipulation of the hot bus system 108 and the mission critical devices 104.

Figure 4:
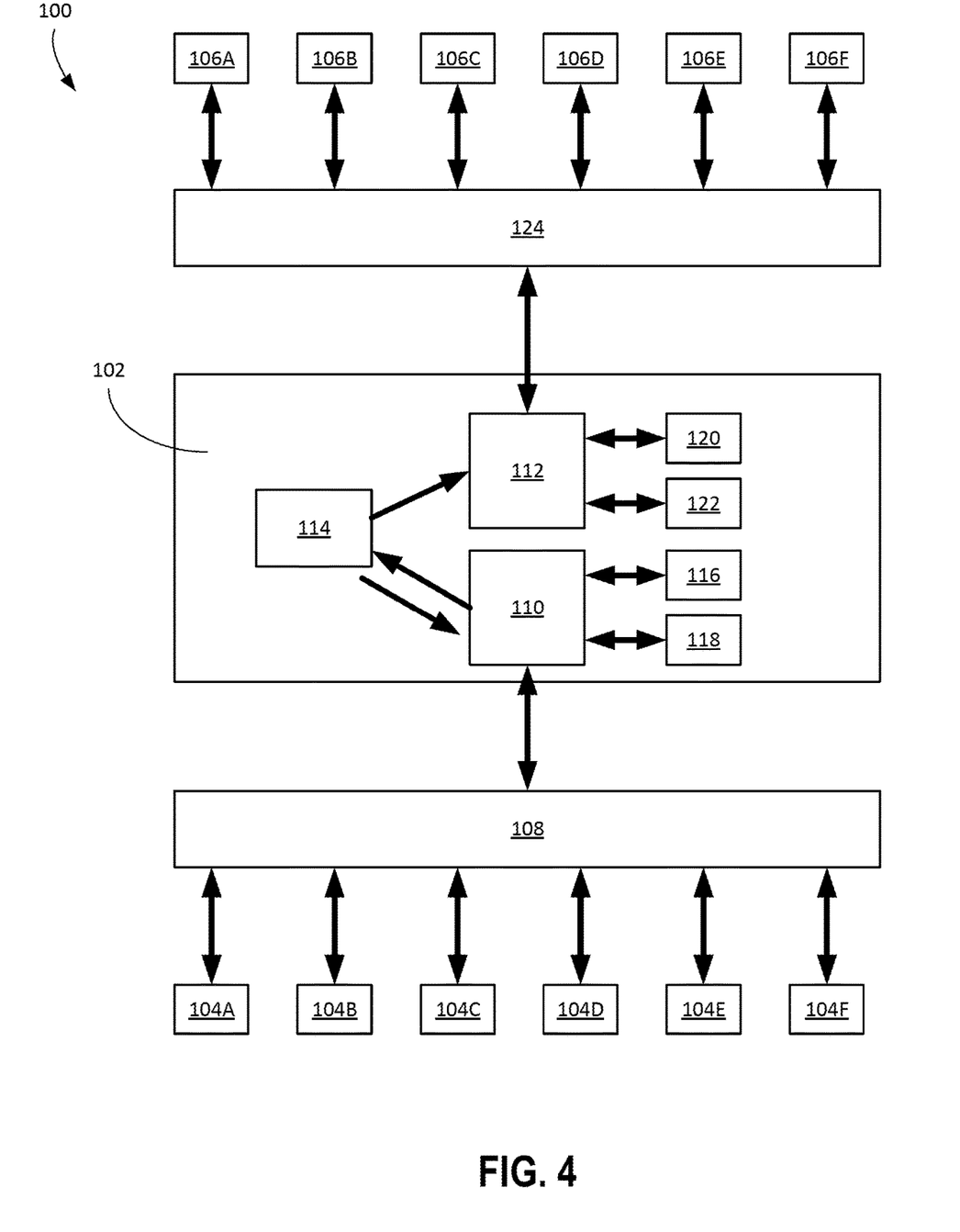
FIG. 4 is a schematic of a transportation device with a bus emulator device according to embodiments of the disclosure.

FIG. 4 illustrates another configuration of the first independent computer 110, the second independent computer 112, and the information interface 114 where the second independent computer 112 can read current and past status information provided by or on the first independent computer 110 but cannot modify such information. Compared to the configuration illustrated in FIG. 1, in the configuration of FIG. 4, the first independent computer 110 has full access to the information interface 114 (e.g., read, write, delete, modify, etc.). In this example, the information interface 114 is a shared memory where the first independent computer 110 has read and write capabilities, and the second independent computer 112 only has read capabilities. In this example, the information interface 114 may always include the information from the hot bus system 108.

Figure 5:
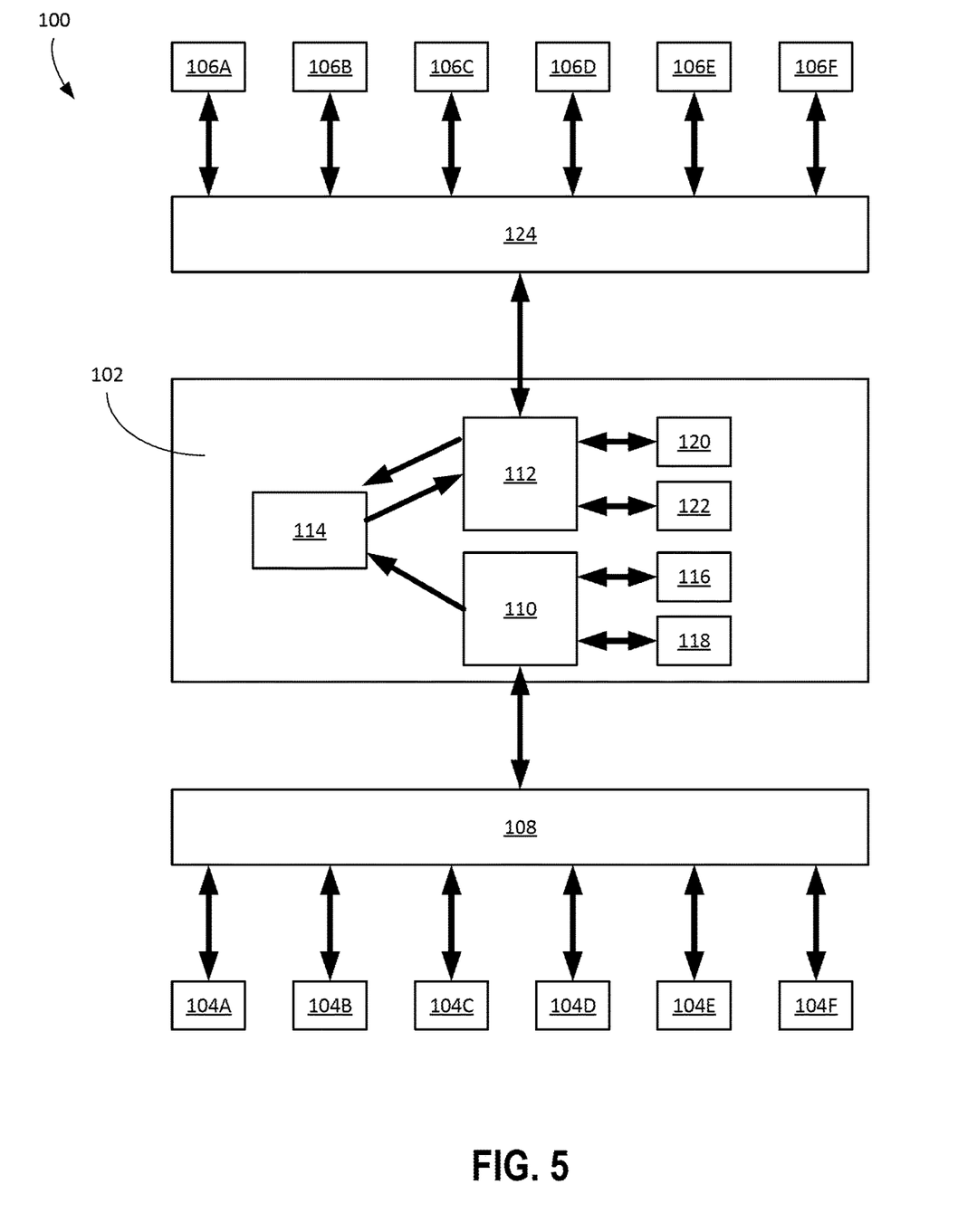
FIG. 5 is a schematic of a transportation device with a bus emulator device according to embodiments of the disclosure.

FIG. 5 illustrates another configuration of the first independent computer 110, the second independent computer 112, and the information interface 114 where the second independent computer 112 can read current and past status information provided by or on the first independent computer 110 but cannot modify such information to control the hot bus system 108. In this example, and compared to the configuration illustrated in FIG. 1, the first independent computer 110 only has write access, and the second independent computer 112 has both read and write access. In this example, the information interface 114 is controlled by the second independent computer 112, and the second independent computer can use the information interface 114 to directly emulate the cold bus 124. In this example, because the first independent computer 110 only has write access, any modifications to the memory made by the second independent computer 112 cannot be used to control the main bus system 108. In this example, the information interface 114 may or may not always include current or past information of the hot bus system 108.

Figure 6:
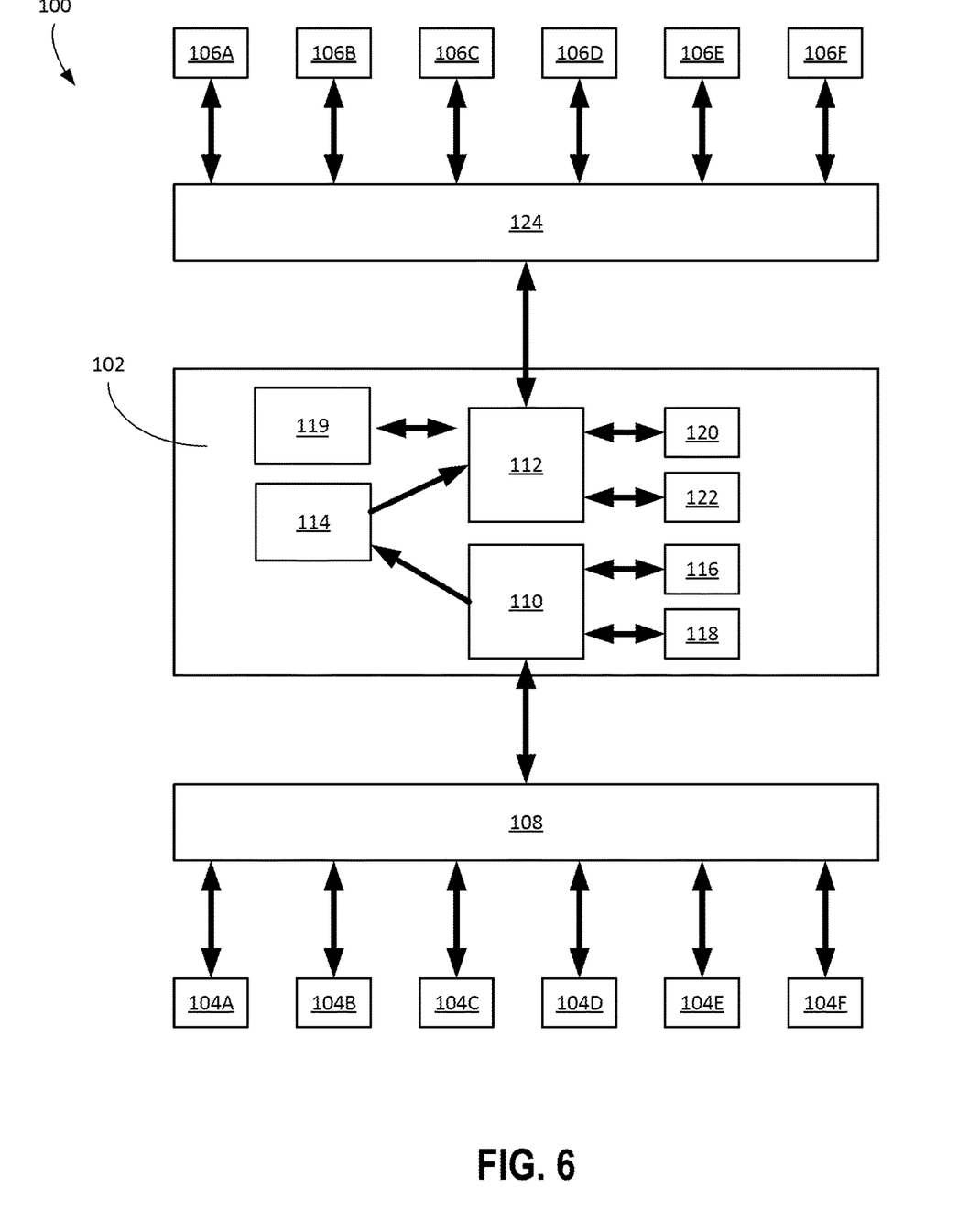
FIG. 6 is a schematic of a transportation device with a bus emulator device according to embodiments of the disclosure.

FIG. 6 illustrates another configuration of the first independent computer 110, the second independent computer 112, and the information interface 114 where the second independent computer 112 can read current and past status information provided by or on the first independent computer 110 but cannot modify such information to control the hot bus system 108. In this example, and compared to the configuration illustrated in FIG. 1, the second independent computer 112 has an additional memory 119. The additional memory 119 may be the same type of memory as the information interface 114 or a different type of memory as desired. The first independent computer 110 may similarly have an additional memory, although it need not in other examples. In the example of FIG. 6, although the first independent computer 110 is illustrated with only write access to the information interface 114, in other examples the first independent computer 110 may have full access to the information interface 114. In the example of FIG. 6, the first independent computer 110 builds up the information about the hot bus system 108 on at least the information interface 114. The second independent computer 112 copies the information from the information interface 114 to the additional memory 119. The peripheral devices 106 may read and/or modify the information on the additional memory 119 as desired.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A bus emulator device comprising: a first computer; a second computer; and an information interface, wherein the first computer is configured to connect to a maim bus system, wherein the first computer comprises only write access into the information interface, and wherein the second computer comprises only read access into the information interface.

Illustration 2. The bus emulator device of any preceding or subsequent illustrations or combination of illustrations, wherein the main bus system comprises at least one mission critical system, and wherein the second computer is configured to simulate the at least one mission critical system in an emulated bus system.

Illustration 3. The bus emulator device of any preceding or subsequent illustrations or combination of illustrations, wherein the emulated bus system comprises at least one peripheral system connectable to an external network.

Illustration 4. The bus emulator device of any preceding or subsequent illustrations or combination of illustrations, further comprising a tact generator, and wherein the first computer, the second computer, and the information interface run on the tact generator.

Illustration 5. A system comprising: a first bus system; a second bus system; and a bus emulator device connected to the first bus system and the second bus system, wherein the bus emulator device physically isolates the first bus system from the second bus system.

Illustration 6. The system of any preceding or subsequent illustrations or combination of illustrations, wherein the first bus system is a main bus system comprising at least one mission critical system, and wherein the second bus system comprises at least one peripheral system connectable to an external network and an emulated system simulating the at least one mission critical system.

Illustration 7. A bus system comprising: a first system; and a second system, wherein the first system is at least one physical system, and the bus system is directly connected to the at least one physical system, and wherein the second system is an emulated system comprising at least one simulation of a third system.

Illustration 8. A bus emulator device comprising an information interface, wherein the bus emulator device is configured to connect to a main bus system and an emulated bus system, and wherein the information interface defines a one-way data exchange between the main bus system and the emulated bus system.

Illustration 9. A bus emulator device comprising: a first computer; a second computer; and an information interface, wherein the first computer is configured to connect to a main bus system, wherein the first computer comprises at least write access into the information interface, and wherein the second computer comprises only read access into the information interface.

Illustration 10. The bus emulator device of any preceding or subsequent illustrations or combination of illustrations, wherein the first computer further comprises read access into the information interface.

Illustration 11. A bus emulator device comprising: a first computer, a second computer; and an information interface, wherein the first computer is configured to connect to a main bus system, wherein the first computer comprises only write access into the information interface, and wherein the second computer comprises at least read access into the information interface.

Illustration 12. The bus emulator device of any preceding or subsequent illustrations or combination of illustrations, wherein the second computer further comprises write access into the information interface.

Illustration 13. A bus emulator device comprising: a first computer; a second computer; an information interface; and an additional memory, wherein the first computer is configured to connect to a main bus system, wherein the first computer comprises at least write access into the information interface, wherein the second computer comprises only read access into the information interface, wherein the first computer has no access to the additional memory, and wherein the second computer comprises read access and write access into the additional memory.

Illustration 14. A system comprising, a first bus system; a second bus system, and a bus emulator device connected to the first bus system and the second bus system, wherein the bus emulator device physically isolates the first bus system from the second bus system.

Illustration 15. The system of any preceding or subsequent illustrations or combination of illustrations, wherein the first bus system is a main bus system comprising at least one mission critical system, and wherein the second bus system comprises at least one peripheral system connectable to an external network and an emulated system simulating the at least one mission critical system.

Illustration 16. The system of any preceding or subsequent illustrations or combination of illustrations, wherein the bus emulator device comprises: a first computer; a second computer; and an information interface, wherein the first computer connected to the first bus system, wherein the first computer comprises write access into the information interface, and wherein the second computer comprises only read access into the information interface.

Illustration 17. The system of any preceding or subsequent illustrations or combination of illustrations, wherein the first computer further comprises read access into the information interface.

Illustration 18. The system of any preceding or subsequent illustrations or combination of illustrations, wherein the second computer is connected to the second bus system.

Illustration 19 The system of any preceding or subsequent illustrations or combination of illustrations, wherein the bus emulator device comprises: a first computer; a second computer; and an information interface, wherein the first computer connected to the first bus system, wherein the first computer comprises only write access into the information interface, and wherein the second computer comprises read access into the information interface.

Illustration 20 The system of any preceding or subsequent illustrations or combination of illustrations, wherein the second computer further comprises write access into the information interface.

Illustration 21. A bus emulator device comprising: a first computer; a second computer; and an information interface, wherein the first computer is configured to connect to a main bus system, wherein the first computer comprises at least write access into the information interface, and wherein the second computer comprises only read access into the information interface.

Illustration 22. The bus emulator device of any preceding or subsequent illustrations or combination of illustrations, wherein the first computer further comprises read access into the information interface.

Illustration 23. The bus emulator device of any preceding or subsequent illustrations or combination of illustrations, wherein the first computer comprises only write access into the information interface.

Illustration 24. The bus emulator device of any preceding or subsequent illustrations or combination of illustrations, wherein the main bus system comprises at least one mission critical system, and wherein the second computer is configured to simulate the at least one mission critical system in an emulated bus system.

Illustration 25. The bus emulator device of any preceding or subsequent illustrations or combination of illustrations, wherein the emulated bus system comprises at least one peripheral system connectable to an external network.

Illustration 26. The bus emulator device of any preceding or subsequent illustrations or combination of illustrations, further comprising a tact generator, and wherein the first computer, the second computer, and the information interface run on the tact generator.

Illustration 27. The bus emulator device of any preceding or subsequent illustrations or combination of illustrations, further comprising: an additional memory, wherein the first computer has no access to the additional memory, and wherein the second computer comprises read access and write access into the additional memory.

Illustration 28. A bus emulator device comprising: a first computer; a second computer; and an information interface, wherein the first computer is configured to connect to a main bus system, wherein the first computer comprises only write access into the information interface, and wherein the second computer comprises at least read access into the information interface.

Illustration 29. The bus emulator device of any preceding or subsequent illustrations or combination of illustrations, wherein the second computer further comprises write access into the information interface.

Illustration 30. The bus emulator device of any preceding or subsequent illustrations or combination of illustrations, wherein the second computer comprises only read access into the information interface.

Illustration 31. The bus emulator device of any preceding or subsequent illustrations or combination of illustrations, wherein the main bus system comprises at least one mission critical system, wherein the second computer is configured to simulate the at least one mission critical system in an emulated bus system, and wherein the emulated bus system comprises at least one peripheral system connectable to an external network.

Illustration 32. The bus emulator device of any preceding or subsequent illustrations or combination of illustrations, further comprising: an additional memory, wherein the first computer has no access to the additional memory, and wherein the second computer comprises read access and write access into the additional memory.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention.

That which is claimed:

1. A bus emulator device comprising:
    a first computer;
    a second computer; and
    an information interface,
    wherein the first computer is configured to connect to a main bus system comprising at least one mission critical device and write information and data from the at least one mission critical device into the information interface, and the second computer is configured to read the information and data from the information interface and use the data and information to emulate the main bus system in an emulated bus system, and
    wherein either (i) the first computer comprises at least write access into the information interface, and the second computer comprises read-only access into the information interface, or (ii) the first computer comprises write-only access into the information interface and wherein the second computer comprises at least read access into the information interface.

2. The bus emulator device of claim 1, wherein the second computer comprises read-only access into the information interface and the first computer further comprises at least read and write access into the information interface.

3. The bus emulator device of claim 1 wherein the first computer comprises write-only access into the information interface and the second computer comprises at least read and write access into the information interface.

4. The bus emulator device of claim 1, wherein the emulated bus system comprises at least one peripheral system connectable to an external network.

5. The bus emulator device of claim 1, further comprising a tact generator, and wherein the first computer, the second computer, and the information interface run on the tact generator.

6. The bus emulator device of claim 1, further comprising:
    an additional memory,
    wherein the first computer has no access to the additional memory, and
    wherein the second computer comprises read access and write access into the additional memory.

7. A system comprising the bus emulator device of claim 1, a first bus system, and a second bus system, wherein the bus emulator device is connected to the first bus system and the second bus system, wherein the bus emulator device physically isolates the first bus system from the second bus system.

\* \* \* \* \*